(12) United States Patent
Hampson

(10) Patent No.: US 12,319,883 B2
(45) Date of Patent: Jun. 3, 2025

(54) BRIQUETTES

(71) Applicant: KNAUF INSULATION SPRL, Vise (BE)

(72) Inventor: Carl Hampson, Liverpool (GB)

(73) Assignee: Knauf Insulation SPRL, Vise (BE)

( * ) Notice: Subject to any disclaimer, the term of this patent is extended or adjusted under 35 U.S.C. 154(b) by 0 days.

(21) Appl. No.: 18/408,212

(22) Filed: Jan. 9, 2024

(65) Prior Publication Data

US 2024/0141247 A1 May 2, 2024

Related U.S. Application Data

(63) Continuation of application No. 17/889,433, filed on Aug. 17, 2022, now abandoned, which is a continuation of application No. 17/504,409, filed on Oct. 18, 2021, now abandoned, which is a continuation of application No. 17/058,231, filed as application No. PCT/EP2019/063435 on May 24, 2019, now abandoned.

(30) Foreign Application Priority Data

May 29, 2018 (GB) .................................. 1808716

(51) Int. Cl.
| | |
|---|---|
| *C10L 5/04* | (2006.01) |
| *C03C 13/06* | (2006.01) |
| *C04B 7/02* | (2006.01) |
| *C04B 7/32* | (2006.01) |
| *C04B 14/46* | (2006.01) |
| *C04B 18/04* | (2006.01) |
| *C10L 5/14* | (2006.01) |
| *C10L 5/36* | (2006.01) |

(52) U.S. Cl.
CPC ............. *C10L 5/04* (2013.01); *C03C 13/06* (2013.01); *C04B 7/02* (2013.01); *C04B 7/32* (2013.01); *C04B 14/46* (2013.01); *C04B 18/0427* (2013.01); *C10L 5/14* (2013.01); *C10L 5/361* (2013.01); *C10L 2290/32* (2013.01); *C10L 2290/58* (2013.01)

(58) Field of Classification Search
CPC .... C10L 5/04; C10L 5/14; C10L 5/361; C10L 2290/32; C10L 2290/58; C03C 13/06; C03C 1/002; C03C 1/026; C03C 14/008; C04B 7/02; C04B 7/32; C04B 14/46; C04B 18/0427; Y02W 30/91; C03B 1/02; C03B 37/012

See application file for complete search history.

(56) References Cited

U.S. PATENT DOCUMENTS

| | | | |
|---|---|---|---|
| 7,655,711 B2 | 2/2010 | Swift et al. | |
| 8,940,089 B2 | 1/2015 | Hampson et al. | |
| 2006/0162391 A1* | 7/2006 | Hansen | C03C 13/06 65/482 |
| 2012/0183774 A1* | 7/2012 | Cuypers | C04B 35/195 264/603 |
| 2012/0186491 A1* | 7/2012 | Cuypers | B02C 19/18 241/23 |
| 2013/0165553 A1 | 6/2013 | Cuypers et al. | |
| 2017/0144912 A1 | 5/2017 | Yammine et al. | |
| 2021/0155865 A1* | 5/2021 | Hampson | C10L 5/14 |
| 2022/0274861 A1* | 9/2022 | Slotte | C03B 5/005 |

FOREIGN PATENT DOCUMENTS

| | | |
|---|---|---|
| JP | H01 192743 A | 8/1989 |
| WO | 95/34514 A1 | 12/1995 |
| WO | 99/28253 A1 | 6/1999 |
| WO | 2012/013780 A1 | 2/2012 |
| WO | 2017/194717 A1 | 11/2017 |
| WO | 2017/194726 A1 | 11/2017 |
| WO | 2018/115173 A1 | 6/2018 |
| WO | 2018/115182 A1 | 6/2018 |

OTHER PUBLICATIONS

International Search Report and Written Opinion for PCT/EP2019/063435 (13 pages), completed Jun. 29, 2019.
Office action for U.S. Appl. No. 17/058,231 (17 pages)—Jul. 16, 2021.
Office action for U.S. Appl. No. 17/504,409 (17 pages)—Apr. 18, 2022.
Office action for U.S. Appl. No. 17/889,433 (8 pages)—Oct. 13, 2023.

* cited by examiner

*Primary Examiner* — Ellen M McAvoy
(74) *Attorney, Agent, or Firm* — Barnes & Thornburg LLP

(57) ABSTRACT

A briquette for use as a mineral charge in a cupola furnace for the production of mineral wool fibres is produced by combining:
a) recycled waste mineral wool selected from i) waste mineral wool comprising uncured sugar containing binder, ii) waste mineral wool comprising cured binder, iii) waste mineral wool without binder and iv) combination thereof,
b) cement, and
c) additional sugar(s)
to form a mouldable mixture and
moulding and curing the mouldable mixture to form the briquette.

19 Claims, No Drawings

BRIQUETTES

CROSS-REFERENCE TO RELATED APPLICATIONS

This application is a continuation of U.S. application Ser. No. 17/889,433, filed Aug. 17, 2022, which is a continuation of U.S. application Ser. No. 17/504,409 (now abandoned), filed Oct. 18, 2021, which is a continuation of U.S. application Ser. No. 17/058,231 (now abandoned), filed Nov. 24, 2020, which is a U.S. national counterpart application of International Application Serial No. PCT/EP2019/063435, filed May 24, 2019, under 35 U.S.C. § 371, which claims priority to GB Application Serial No. 1808716.3, filed May 29, 2018, the disclosures of which are hereby incorporated herein by reference.

The present invention relates to briquettes, a process for their production, and the use of briquettes as mineral charge for the production of mineral wool fibres and the subsequent production of mineral wool fibre insulation products.

According to one aspect, the present invention provides a method of manufacturing a briquette as defined in claim 1. According to another aspect, the present invention provides a method of manufacturing a briquette as defined in claim 4. The dependent claims define preferred or alternative embodiments. According to another aspect, the present invention provides a method of manufacturing a mineral wool fibre insulation product as defined in claim 13.

Surprisingly it has been found that it is possible to obtain after at least 3 days, the required compressive strength of the briquette when the mouldable mixture to form the briquette comprises sugar(s), wherein there is at least 10 parts by dry weight of sugar(s) with respect to 100 parts by dry weight of the cement.

When the mouldable mixture comprises recycled waste mineral wool selected from i) waste mineral wool comprising uncured sugar containing binder, ii) waste mineral wool comprising cured binder, iii) waste mineral wool without binder and iv) combination thereof, the quantity of the i) waste mineral wool comprising uncured sugar containing binder may be adapted in order to have at least 10 parts by dry weight of sugar(s) with respect to 100 parts by dry weight of the cement.

Alternatively, when the mouldable mixture comprises waste mineral wool comprising uncured sugar containing binder wherein there would be less than 10 parts by dry weight of sugar(s) with respect to 100 parts by dry weight of the cement, additional sugar(s) may be added in order to have at least 10 parts by dry weight of sugar(s) with respect to 100 parts by dry weight of the cement.

Alternatively when the mouldable mixture comprises waste mineral wool wherein the composition of the waste mineral wool is not known and/or wherein the quantity of sugar(s) within the waste mineral wool comprising uncured sugar containing binder is not known, sugar(s) may be added in order to have at least 10 parts by dry weight of sugar(s) with respect to 100 parts by dry weight of the cement.

It is surprising that the presence or addition of sugar(s) in order to have at least parts by dry weight of sugar(s) with respect to 100 parts by dry weight of the cement in the mouldable mixture allows to have accurate compressive strength within at least 3 days since sugar is known to be a retarder for cement, as disclosed within WO2012/013780. Faced to problem of intolerable curing times of cement-containing briquettes when the MMVF waste comprised non-cured or partly cured sugar containing mineral wool binder, WO2012/013780 proposed as a solution that the sugar-containing MMVF binder additionally comprises a reaction product of a polycarboxylic acid component and an amine component.

In comparison to the solution proposed in WO2012/013780 wherein the reaction product(s) of a polycarboxylic acid component and an amine component has to be added in to the MMVF binder, the proposed solution of addition of sugar(s) within the mouldable mixture is an easy solution that is compatible with any type of recycled waste mineral wool. Moreover sugars are compounds that can be manipulated without particularly precaution so it is an easy and safe applicable solution.

In plant comprising several production lines of mineral wool fibre insulation products wherein different binders are used for some of the said production lines, the waste mineral wool of the different production lines may be combined indifferently when additional sugar(s) is subsequently added in the mouldable mixture in order to have at least 10 parts by dry weight of sugar(s) with respect to 100 parts by dry weight of the cement. For example in a plant comprising a line of mineral wool fibre using a phenol formaldehyde binder and another line of mineral wool fibre using sugar containing binder, wastes of both lines may be combined without any further attention than the addition of additional sugar(s) within the mouldable mixture such as to have at least 10 parts by dry weight of sugar(s) with respect to 100 parts by dry weight of the cement.

The method of manufacturing mineral wool fibres from mineral charge comprising briquettes manufactured in accordance with the present invention is described below in more details.

The method of manufacturing mineral wool fibres comprises introducing mineral charge in to a melter, melting the mineral charge to provide a melt and fiberizing the melt to form the mineral wool fibres.

Mineral charge introduced in to the melter may comprise virgin raw material and recycled material. Mineral charge may comprise material selected from basalt, gabbro, dolomite, calcined alumina and recycled materials including stone wool fibres and slag.

During the manufacture of mineral wool products, waste mineral wool fibres arises, for example, trimming waste, spinning waste, shots, and discarded mineral wool fibres product. These waste products may be thrown away or preferably are recycled as part of the mineral charge for the manufacture of subsequent mineral wool fibres. These waste mineral wool fibres may be processed and compacted with cement in to briquettes. The briquettes may represent ≥10 wt-%, ≥15 wt-%, ≥20 wt-% or ≥25 wt-%; and/or ≤80 wt-%, ≤70 wt-%, ≤60 wt-%, or ≤50 wt-% of the mineral charge introduced in to the melter.

The term wt-% as used herein signifies weight %.

The briquettes comprise a) waste mineral wool formed during the production of mineral wool fibre products and b) cement. Briquettes may also comprise one or more mineral fillers; the mineral fillers may comprise undersized virgin raw material, undersized coke. Depending on the stage of the production at which the waste mineral wool is formed, the waste mineral wool may comprise uncured binder, cured binder, partially cured binder or no binder. For example spinning waste mineral wool comprises uncured binder, and discarded mineral wool fibres products comprise cured binder.

When the mouldable mixture comprises at least 10 parts by dry weight of sugar(s) per 100 parts by dry weight of cement, it has been found that it is possible to obtain the required compressive strength of the briquette after at least 3 days.

The sugar(s) within the mouldable mixture may come from:
  waste mineral wool comprising uncured sugar containing binder, and/or
  additional sugar(s).

The additional sugar(s) and the sugar(s) from the uncured sugar containing binder may be the same or different.

The sugar(s) comprise preferably a reducing sugar or a carbohydrate compound having a dextrose equivalent of at least about 50, at least about 60, at least about 70, at least about 80 or at least about 90 or mixtures thereof. The reducing sugar may comprise a monosaccharide in its aldose or ketose form. The sugar may comprise: a disaccharide, a polysaccharide, a triose, a tetrose, a pentose, xylose, a hexose, dextrose, fructose, a heptose, molasses, sucrose, starch, starch hydrolysate, cellulose hydrolysates, reaction product(s) thereof or mixtures thereof. Preferably the sugar(s) comprise sugar(s) selected from the group consisting of dextrose, fructose, sucrose, HFCS (high fructose corn syrup) and combinations thereof.

In a preferred embodiment in accordance with the production of briquette of the present invention, the mouldable mixture may comprise 10 to 40 parts by dry weight, preferably 15 to 30 parts by dry weight, more preferably 17.5 to 25 parts by dry weight, of sugar(s) per 100 parts by dry weight of cement in order to produce briquette with desired mechanical strength. The mouldable mixture may comprise more than 10, 12.5, 15, 17.5, or 20 parts by dry weight and/or less than 40, 35, 30, or 25 parts by dry weight of sugar(s) per 100 parts by dry weight of cement.

Cement used for the briquettes of the present invention may comprise cement selected from the group consisting of Portland cement, alumina cement, blast furnace cement, fly ash cement, pozzolan cement, silica fume cement, clinker cement, slag lime cement and gypsum free cement. Preferably the cement comprises Portland cement.

The mouldable mixture may comprise more than 5 wt-%, 10 wt-%, 15 wt-%, or 20 wt-%; and/or less than 40 wt-%, 35 wt-%, 30 wt-%, or 25 wt-% by dry weight of cement based on the total dry weight of the mouldable mixture in order to produce briquette with desired mechanical strength.

The mouldable mixture may comprise more than 30, 40, 50, or 60 wt-%, by dry weight and/or less than 90, 85, 80, 75 or 70 wt-% by dry weight of recycled waste mineral wool based on the total dry weight of the mouldable mixture.

The mouldable mixture may comprise more than 1, 5, or 10 wt-% by dry weight and/or less than 35, 30, 25, 20 or 15 wt-%, by dry weight of mineral filler(s) based on the total dry weight of the mouldable mixture. The mineral fillers may comprise undersized virgin raw material, undersized coke. The mineral filler may notably comprise bauxite.

The briquette may be produced by a method comprising:
  combining recycled waste mineral wool, cement and possible additional sugar(s) to form a mouldable mixture wherein the mouldable mixture comprises at least 10 parts by dry weight of sugar per 100 parts by dry weight of cement, and
  moulding and curing the mouldable mixture.

The waste mineral wool and/or the mineral filler(s) may be crushed and/or chopped, and/or milled before being mixed with the cement and the possible additional sugar(s).

The step of mixing the waste mineral wool with the cement and the additional sugar(s) comprise addition of water. The water ratio of water to cement may be greater than 0.3, or 0.5, or 0.7 or and/or less than 1.4, 1.2 or 1.0. The water content of the mouldable mixture may be greater than 5, or 7, or 10 wt-% and/or less than 20, or 18, or 15 wt-% by total weight of the mouldable mixture.

The mouldable mixture may be introduced into moulds and may be subsequently pressed and/or cured, simultaneously or successively to obtain briquettes. Briquettes obtained from the moulding and curing of the mouldable mixture in accordance with the present invention may have a height that is greater than 3 cm, 4 cm, 5 cm, 6 cm, or 7 cm and/or less than 20 cm, 15 cm, 12 cm, or 10 cm; and a maximum dimension (width and/or depth) perpendicular to their height which is greater than 3 cm, 4 cm, 5 cm, 6 cm, or 7 cm and/or less than 20 cm, 15 cm, 12 cm, or 10 cm. The briquettes may be hexagonal in cross section perpendicular to its height.

The moulded mouldable mixture may be pressed under a pressure that may be greater than 20 kPa, or 25 kPa, or 30 kPa, or 35 kPa and or less than 60 kPa, or 55 kPa, or 50 kPa, or 45 kPa.

Curing and/or drying of the mouldable mixture may be made at a temperature that may be greater than 10° C., or 15° C., or 20° C., or 25° C., and/or less than 55° C., or 50° C., or 45° C., or 40° C. with a humidity that may be greater than 50%, or 55%, or 60% and/or be less than 90%, or 85%, or 80%.

Curing of the mouldable mixture may be occur for at least 12 hours, 24 hours, 36 hours or 48 hours and/or less than 144 hours, 120 hours, or 94 hours, or 72 hours.

The briquettes may be dried prior to introduction in to the melter, notably left to dry for a period which is ≥2 days or ≥3 days and/or ≤10 days or ≤6 days. The briquettes, notably when introduced in to the melter, may have a compressive strength that may be greater than 1.5 MPa, 2 MPa, 2.5 MPa, 3 MPa, or 3.5 MPa; and/or less than 20 MPa, 15 MPa, 10 MPa, 7.5 MPa or 6 MPa. The compression strength is preferably between 3 and 6 MPa.

The briquettes produced in accordance with the present invention may then be used as a mineral charge for the production of a mineral wool fibre insulation product.

The method of producing a mineral wool fibre insulation product may comprise the sequential steps of:
  producing a mineral melt by melting in a furnace mineral charge comprising the briquettes;
  forming mineral wool fibres from the mineral melt
  spraying a binder solution, notably an aqueous binder solution, on to the mineral fibres;
  collecting the mineral fibres to which the binder solution has been applied to form a blanket of mineral fibres; and
  curing the binder solution by passing the blanket of mineral fibres through a curing oven.

Waste mineral wool fibres arising during the production of the mineral wool fibre insulation product may be subsequently recycled and used for the manufacturing of briquettes.

The mineral wool fibres of the present invention, may be stone wool fibres, they may have a chemical composition comprising:
  to 55 wt-% $SiO_2$, and
  to 30 wt-% $Al_2O_3$, and
  to 35 wt-% of the combination of CaO and MgO, and
  4 to 14 wt-% total iron expressed as $Fe_2O_3$, and
  less than 8 wt-% of the combination of $Na_2O$ and $K_2O$, and preferably
  an alkali/alkaline-earth ratio which is <1.

The quantity of $SiO_2$ in the mineral wool fibres may be ≥35 wt-% or ≥38 wt-% and/or ≤50 wt-%, or ≤45 wt-%. The quantity of $Al_2O_3$ in the mineral wool fibres may be ≥12 wt-% or ≥15 wt-% and/or ≤25 wt-% or ≤20 wt-%. The quantity of the combination of CaO and MgO in the mineral wool fibres may be ≥25 wt-% and/or ≤30 wt-%. The quantity of the combination of $Na_2O$ and $K_2O$ in the mineral wool fibres may be ≥1 wt-% or ≥2 wt-% or ≥4 wt-% and/or ≤5 wt-% or ≤4 wt-%. The total iron content expressed as $Fe_2O_3$ in the mineral wool fibres may be ≥5 wt-% or ≥6 wt-% and/or ≤12 wt-% or ≤10 wt-%.

The mineral wool fibres are preferably bio-soluble; in particular, the mineral wool fibres preferably satisfy the requirements under Note Q of EU Directive 67/548/EEC for exemption from the classification, packaging and labelling provisions of that Directive.

Prior to curing, the mineral fibres to which the binder solution has been applied may be collected to form a primary blanket of mineral fibres which is subsequently folded over itself, for example using a pendulum mechanism, to produce a secondary blanket comprising superimposed layers of the primary blanket.

The solids content of the binder solution applied to the mineral fibres may be ≥4 wt-% or ≥6 wt-% or ≥10 wt-% or ≥12 wt-% and/or ≤25 wt-% or ≤20 wt-% or ≤18 wt-%. The term "dry weight of the binder solution" as used herein means the weight of all components of the binder solution other than any water that is present (whether in the form of liquid water or in the form of water of crystallization).

Preferably the binder solution does not comprise any added formaldehyde. It may be "substantially formaldehyde free", that is to say that it liberates less than 5 ppm formaldehyde as a result of drying and/or curing (or appropriate tests simulating drying and/or curing); more preferably it is "formaldehyde free", that is to say that it liberates less than 1 ppm formaldehyde in such conditions.

Preferably the binder solution is a sugar containing binder. The binder solution may comprise reducing sugar(s), notably in a quantity which is a) ≥30%, ≥40%, ≥50%, ≥60%, ≥70% or ≥80% of the dry weight of the binder solution and/or b) ≤97% or ≤95% of the dry weight of the binder solution.

The reducing sugar(s) may be selected from one or more: monosaccharide, monosaccharide in aldose or ketose form, disaccharide, polysaccharide, triose, tetrose, pentose, xylose, hexose, dextrose, fructose, heptose. The reducing sugar(s) may be yielded in situ by carbohydrate compound(s), notably high fructose corn syrup (HFCS), molasses, starch hydrolysate, cellulose hydrolysates, sucrose, and mixtures thereof. The reducing sugar(s) may have a dextrose equivalent of at least about 50, at least about 60, at least about 70, at least about 80 or at least about 90.

The binder solution may comprise nitrogen-containing compound(s), notably in a quantity which is a) ≥2.5%, ≥5% or ≥10% of the dry weight of the binder solution and/or b) ≤50%, ≤40%, ≤30% or ≤25% of the dry weight of the binder solution. The nitrogen-containing compound(s) may be selected from one or more: $NH_3$, inorganic amine, organic amine comprising at least one primary amine group and/or salts thereof, inorganic and organic ammonium salt, ammonium sulfate, ammonium phosphate, diammonium phosphate, ammonium citrate, diamine, polyamine, primary polyamine (ie an organic compound having two or more primary amine groups (—$NH_2$)), 1,6-diaminohexane (hexamethylenediamine, HMDA), 1,5-diamino-2-methylpentane (2-methyl-pentamethylenediamine), 4-(aminomethyl)-1,8-octanediamine.

The binder solution may comprise, by dry weight, (i) ≥25%, ≥40%, ≥50% or ≥60% of the combination of: (a) reducing sugar(s) and nitrogen-containing compound(s) and/or (b) curable reaction product(s) of reducing sugar(s) and nitrogen-containing compound(s). The nitrogen-containing compound(s) and the reducing sugar(s) (or their reaction product(s)) preferably react to form Maillard reaction products, notably melanoidins when cured. Curing of the binder may comprise or consist essentially of Maillard reaction(s). Preferably the cured binder consists essentially of Maillard reaction products. The cured binder may comprise melanoidin-containing and/or nitrogenous-containing polymer(s). The binder may comprise a binder composition as described in any of WO 2007/014236, WO 2009/019232, WO 2009/019235, WO 2011/138458, WO 2011/138459 or WO 2013/150123, each of which is hereby incorporated by reference. The binder may include ester and/or polyester compounds. The cured binder may comprise greater than 2% and/or less than 8% nitrogen by mass as determined by elemental analysis The curing temperature and time for the blanket of mineral wool fibres may be selected as a function of the product density and/or thickness. The curing oven may have a plurality of heating zones having temperatures within the range 200° C. to 350° C. (typically 230° C. to 300° C.). A thin, low density product (12 $kg/m^3$ or less) may be cured by passing through the curing oven in as little as 20 seconds; a thick, high density product (80 $kg/m^3$ or more) may require a passage of 15 minutes or more in the curing oven. The blanket of mineral wool fibres may reach a temperature in the range 180° C. –220° C. during the curing process. The duration of passage of the blanket through the curing oven may be ≥0.5 minutes, ≥1 minute, ≥2 minutes, ≥5 minutes or ≥10 minutes and/or ≤50 minutes, ≤40 minutes or ≤30 minutes.

The quantity of cured binder in the cured blanket of mineral wool fibres may be ≥1%, ≥2%, ≥2.5%, ≥3%, ≥3.5% or ≥4% and/or ≤10% or ≤8%. This may be measured by loss on ignition (LOI).

The cured blanket of mineral wool fibres may have one or more of the following features:
- a density greater than 15, 20 or 25 $kg/m^3$ and/or less than 220, 200 or 180 $kg/m^3$;
- a thermal conductivity λ measured at 10° C. which is ≤40 mW/m·K and/or ≥20 mW/m·K, notably when measured in accordance with ISO 8301;
- comprise less than 99% by weight and/or more than 80% by weight mineral fibres;
- a thickness of greater than 10 mm, 15 mm or 20 mm and/or less than 400 mm, 350 mm or 300 mm;
- a length which is ≥90 cm, ≥120 cm, ≥150 cm and/or ≤220 cm or ≤180 cm;
- a width which is ≥50 cm, ≥70 cm and/or ≤100 cm or ≤90 cm.

The mineral wool fibre insulation product, particularly when it is a low or medium density product, may have
- a nominal thickness in the range 60-260 mm; and/or
- a thermal resistance R of R≥3 $m^2K/W$, preferably R≥4 $m^2K/W$ at a thickness or 200 mm; and/or
- a density in the range 5-40 $kg/m^3$, particularly 5-18 $kg/m^3$ or 7-12 $kg/m^3$.

The mineral wool fibre insulation product, particularly when it is an insulating board or a higher density product, may have
- a nominal thickness in the range 20 to 200 mm; and/or
- a thermal resistance R of R≥0.7 $m^2K/W$, preferably R≥2 $m^2K/W$ at a thickness or 100 mm; and/or a density in the range 100 to 200 kg/m³, particularly 130 to 190 kg/m³.

The invention will be explained in more details in the non-limiting examples below.

Simplified Briquette Evaluation:

In order to evaluate the influence of the presence/quantity of sugar in regard of cement, compression strength (CS) after 1, 2, 6 and 8 days of storage under ambient conditions (between 20-25° C.) after processing, were measured for simplified briquettes containing different quantities of sugar to Portland cement CEM I 42.5N. Herein simplified briquettes means briquettes consisting of cement, sugar and water. The simplified briquettes have a cylindrical shape with a diameter of about 3 cm and a height of about 5 cm. The compressive strength values given in the tables are average values of three samples.

The compressive strength of the simplified briquettes were measured by breaking the simplified briquette in a compression-testing machine. The compressive strength is calculated from the failure load divided by the cross-sectional area resisting the load and reported in units of megapascals (MPa).

Table 1 and Table 2

Table 1 shows the quantities of the different components used for the production of the simplified briquettes. Table 2 shows the compressive strength for the different mixtures. In this first set of experiment the sugar component used is dextrose monohydrate (at a concentration of 90%). For mixtures 1 to 9, cement and dextrose monohydrate were mixed during 30 s in a mixer before the addition of water and subsequently mixed during 60 s in the mixer. The samples were produced from the mixture previously prepared.

TABLE 1

| Mix | parts by dry weight of dextrose per 100 parts by dry weight of cement | mass of the components (g) | | |
|---|---|---|---|---|
| | | cement | dextrose monohydrate | water |
| 1 | 5 | 1000 g | 55.6 g | 600 g |
| 2 | 7.5 | 1000 g | 83.3 g | 600 g |
| 3 | 10 | 1000 g | 111.1 g | 600 g |
| 4 | 12.5 | 1000 g | 138.9 g | 600 g |
| 5 | 15 | 1000 g | 166.7 g | 600 g |
| 6 | 17.5 | 1000 g | 194.4 g | 600 g |
| 7 | 20 | 1000 g | 222.2 g | 600 g |
| 8 | 22.5 | 1000 g | 250.0 g | 600 g |
| 9 | 25 | 1000 g | 277.8 g | 600 g |

TABLE 2

| Mix | parts by dry weight of dextrose per 100 parts by dry weight of cement | Day 1 CS [MPa] average | Day 2 CS [MPa] average | Day 6 CS [MPa] average |
|---|---|---|---|---|
| 1 | 5 | 0.1 | 0.5 | 0.9 |
| 2 | 7.5 | 0.2 | 0.3 | 1.1 |
| 4 | 12.5 | 0.3 | 0.4 | 1.1 |
| 6 | 17.5 | 0.9 | 1.3 | 2.5 |
| 7 | 20 | 1.9 | 2.3 | 5.3 |
| 8 | 22.5 | 3.6 | 5.0 | 8.4 |
| 9 | 25 | 6.2 | 7.7 | 13.2 |

Table 3 and Table 4

Table 3 shows the quantities of the different components used for the production of the simplified briquettes for a further series of tests. Table 4 shows the compressive strength for the different mixtures. In this second set of experiment the sugar component used is sucrose (at a concentration of 99.9%). Mixtures 10 to 12 were prepared following the same protocol as for mixtures 1 to 9.

TABLE 3

| mix | parts by dry weight of sucrose per 100 parts by dry weight of cement | mass of the components (g) | | |
|---|---|---|---|---|
| | | cement | sucrose | water |
| 10 | 10 | 1000 g | 100 g | 600 g |
| 11 | 15 | 1000 g | 150 g | 600 g |
| 12 | 20 | 1000 g | 200 g | 600 g |

TABLE 4

| Mix | parts by dry weight of sucrose per 100 parts by dry weight of cement | Day 1 CS [MPa] average | Day 2 CS [MPa] average | Day 6 CS [MPa] average | Day 8 CS [MPa] average |
|---|---|---|---|---|---|
| 10 | 10 | 1.2 | 1.4 | 1.9 | 2.8 |
| 11 | 15 | 1.7 | 2.1 | 3.8 | 4.0 |
| 12 | 20 | 1.7 | 2.6 | 3.5 | 4.4 |

Table 5 and Table 6

Table 5 shows the quantities of the different components used for the production of the simplified briquettes for another series of tests. Table 6 shows the compressive strength for the different mixtures. In this third set of experiment the sugar component used is HFCS (High Fructose Corn Syrup) (at a concentration of 75%). For mixtures 13 to 16, the mix of HFCS with water is added to cement and the mixture is subsequently mixed during 60 s in a mixer. The samples were produced.

TABLE 5

| mix | parts by dry weight of HFCS per 100 parts by dry weight of cement | mass of the components (g) | | |
|---|---|---|---|---|
| | | cement | HFCS | water |
| 13 | 7 | 1000 g | 93.3 g | 576.7 g |
| 14 | 10 | 1000 g | 133.3 g | 566.7 g |
| 15 | 15 | 1000 g | 200 g | 550.0 g |
| 16 | 20 | 1000 g | 266.7 g | 533.3 g |

TABLE 6

| Mix | parts by dry weight of HFCS per 100 parts by dry weight of cement | Day 1 CS [MPa] average | Day 2 CS [MPa] average | Day 6 CS [MPa] average | Day 8 CS [MPa] average |
|---|---|---|---|---|---|
| 13 | 7 | 0.4 | 0.6 | | 1.1 |
| 14 | 10 | 0.7 | 0.9 | 1.6 | 1.9 |
| 15 | 15 | 1.1 | 1.5 | 2.1 | 2.3 |
| 16 | 20 | 4.0 | 5.2 | 7.5 | 8.8 |

For the results obtained in tables 2, 4 and 6, it is the variation of the compressive strength between the different samples that is interesting, not the value by itself. As it can be seen in the tables 2, 4 and 6, when the quantity of sugar is increased in the simplified briquettes, the compressive strength also increases, showing that sugar does not act anymore as a retardant for cement when the quantity of sugar in regard of cement is increased.

TABLE 7

| | Briquette production | | | | |
|---|---|---|---|---|---|
| | 17 | 18 | 19 | 20 | 21 |
| cement (%) | 15 | 16 | 16 | 17 | 18 |
| mineral wool waste (%) | 68 | 67 | 66 | 65 | 64 |
| Bauxite (%) | 14 | 14 | 14 | 14 | 14 |
| Dextrose monohydrate (%) | 3.33 | 3 | 3.56 | 3.78 | 4 |
| CS after 3 days [MPa] | 7.8 | 4.6 | 5.6 | 5.5 | 4.8 |

The briquettes were produced AS follow:

Portland cement CEM I 42.5N, mineral wool waste; bauxite, dextrose monohydrate (dextrose monohydrate at a concentration of 90%) and water (to have a total water to cement ratio of 0.7 (including the 10% moisture of the waste) were thoroughly mixed.

The mixture was moulded, pressed and cured. The briquette was then stored during 3 days under ambient conditions. The compressive strength was subsequently measured.

In experiments 17, 19, 20 and 21 there are 20 parts by dry weight of additional dextrose with respect to 100 parts by dry weight of the cement. In experiment 18, there is 16.9 parts by dry weight of additional dextrose with respect to 100 parts by dry weight of the cement.

As can be seen in Table 7, all the produced briquettes have a compressive strength of at least 3.5 MPa after 3 days and are suitable to be used as mineral charge for further production of mineral wool insulation product.

Sufficient mechanical strength is obtained for briquettes when the compressive strength is greater than 3.5 MPa. Greater compressive strengths than 3.5 MPa are not useful but are neither harmful for the briquettes.

The invention claimed is:

1. A method of producing a briquette, suitable for use as a mineral charge in a cupola furnace for the production of mineral wool fibres, said method comprising:
    forming a mouldable mixture comprising
    a) recycled waste mineral wool,
    b) cement, and
    c) at least 10 parts by dry weight of sugar(s) with respect to 100 parts by dry weight of the cement; and
    moulding and curing the mouldable mixture to form the briquette.

2. The method of claim 1, wherein the mouldable mixture comprises 10 to 40 parts by dry weight of sugar(s) per 100 parts by dry weight of cement.

3. The method of claim 1, wherein the cement is selected from the group consisting of Portland cement, alumina cement and mixture thereof.

4. The method of claim 1, wherein the sugar(s) are selected from the group consisting of dextrose, fructose, sucrose and high fructose corn syrup.

5. The method of claim 1, wherein the recycled waste mineral wool comprises waste mineral wool comprising uncured sugar containing binder wherein the uncured sugar containing binder is selected from:
    i) an uncured sugar containing binder comprising reducing sugar(s) and nitrogen-containing compound(s);
    ii) an uncured sugar containing binder comprising curable reaction product(s) of reducing sugar(s) and nitrogen-containing compound(s); and
    iii) an uncured sugar containing binder comprising reducing sugar(s), nitrogen-containing compound(s) and curable reaction product(s) of reducing sugar(s) and nitrogen-containing compound(s).

6. The method of claim 1, wherein the recycled waste mineral wool comprises waste mineral wool comprising cured, nitrogenous polymer-containing binder, wherein the cured binder comprises greater than 2% nitrogen by mass and less than 8% nitrogen by mass as determined by elemental analysis of the cured binder.

7. The method of claim 1, wherein the mouldable mixture comprises 5 to 30 wt-% by dry weight of cement based on the total dry weight of the mouldable mixture.

8. The method of claim 1, wherein the mouldable mixture comprises 30 to 85 wt-% by dry weight of recycled waste mineral wool based on the total dry weight of the mouldable mixture.

9. A briquette wherein the briquette is obtained by the method of claim 1.

10. A method of producing a mineral wool fibre insulation product comprising:
    producing a mineral melt by melting in a furnace a mineral charge comprising briquettes obtained by the method of claim 1;
    forming mineral wool fibres from the mineral melt;
    disposing a binder solution onto the mineral wool fibres;
    arranging the mineral wool fibres upon which a binder solution has been disposed to form a batt; and
    passing the batt through a curing oven to cure the binder solution to form the mineral wool fibre insulation product.

11. A method of producing a briquette, suitable for use as a mineral charge in a cupola furnace for the production of mineral wool fibres, said method comprising:
    combining:
    a) recycled waste mineral wool selected from i) waste mineral wool comprising uncured sugar containing binder, ii) waste mineral wool comprising cured binder, iii) waste mineral wool without binder and iv) combination thereof,
    b) cement, and
    c) sugar(s)
    to form a mouldable mixture, wherein the mouldable mixture comprises at least 10 parts by dry weight of sugar(s) per 100 parts by dry weight of cement; and
    moulding and curing the mouldable mixture to form the briquette.

12. The method of claim 11, wherein the mouldable mixture comprises at least 10 parts by dry weight of the c) sugar(s) per 100 parts by dry weight of cement.

13. The method of claim 11, wherein the mouldable mixture comprises 10 to 40 parts by dry weight of sugar(s) per 100 parts by dry weight of cement.

14. The method of claim 11, wherein the cement is selected from the group consisting of Portland cement, alumina cement and mixture thereof.

15. The method of claim 11, wherein the sugar(s) from:
   a)i) waste mineral wool comprising uncured sugar containing binder, and/or
   c) sugar(s)
   comprise one or more sugar(s) selected from the group consisting of dextrose, fructose, sucrose and high fructose corn syrup.

16. The method of claim 11, wherein the recycled waste mineral wool comprises waste mineral wool comprising uncured sugar containing binder wherein the uncured sugar containing binder is selected from:
   i') an uncured sugar containing binder comprising reducing sugar(s) and nitrogen-containing compound(s);
   ii') an uncured sugar containing binder comprising curable reaction product(s) of reducing sugar(s) and nitrogen-containing compound(s); and
   iii') an uncured sugar containing binder comprising reducing sugar(s), nitrogen-containing compound(s) and curable reaction product(s) of reducing sugar(s) and nitrogen-containing compound(s).

17. The method of claim 11, wherein the recycled waste mineral wool comprises waste mineral wool comprising cured, nitrogenous polymer-containing binder,
   wherein the cured binder comprises greater than 2% nitrogen by mass and less than 8% nitrogen by mass as determined by elemental analysis of the cured binder.

18. The method of claim 11, wherein the mouldable mixture comprises 5 to 30 wt-% by dry weight of the mouldable mixture.

19. The method of claim 11, wherein the mouldable mixture comprises 30 to 85 wt-% by dry weight of recycled waste mineral wool based on the total dry weight of the mouldable mixture.

* * * * *